May 19, 1953     E. J. ANDINA     2,638,964
MACHINE FOR HEAT-SEALING THERMOPLASTIC MATERIALS
Filed Feb. 7, 1950
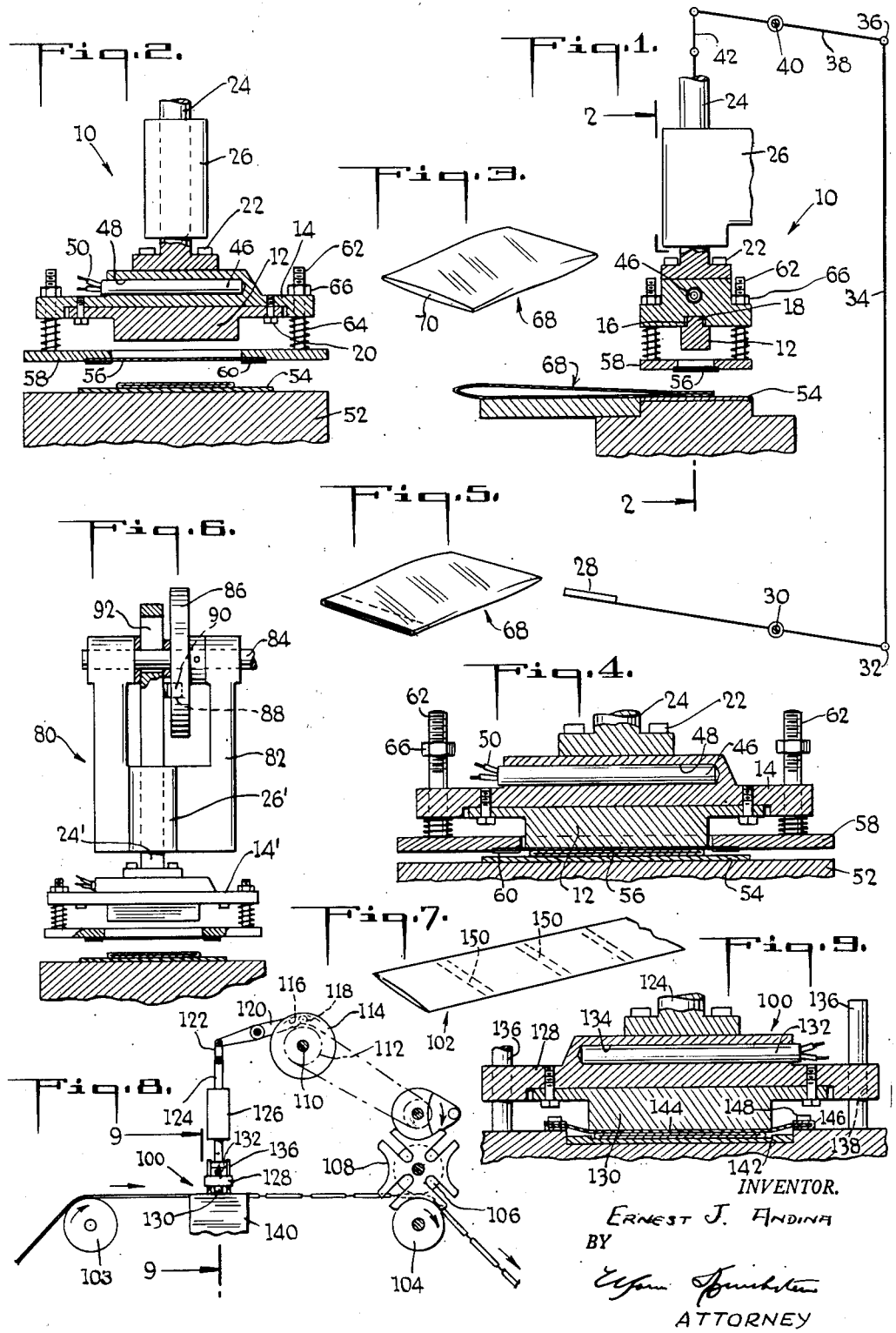

Patented May 19, 1953

2,638,964

UNITED STATES PATENT OFFICE 2,638,964

MACHINE FOR HEAT-SEALING THERMOPLASTIC MATERIALS

Ernest J. Andina, New York, N. Y., assignor to Amsco Packaging Machinery, Inc., Long Island City, N. Y., a corporation of New York Application February 7, 1950, Serial No. 142,745

4 Claims. (Cl. 154—42)

1

This invention relates to machines and methods for heat-sealing thermoplastic materials. More particularly the invention is concerned with apparatuses and processes for effecting a seal of juxtaposed thermoplastic pellicles under the influence of heat and pressure.

Ordinarily it is comparatively simple autogenously to seal two plastic films to one another under the influence of heat and pressure. The conventional method simply is to apply heat and pressure at the point of sealing. This can be carried out, for example, with a pair of pressure jaws, at least one of which is heated, and which are moved toward and away from one another and between which the sheets to be sealed are interposed, or by feeding the layers to be sealed between a pair of pressure rollers at least one of which is heated.

However, some plastics cannot be sealed in such a simple fashion. It has been found that certain plastics are adhesive at heat sealing temperatures and, therefore, tend to stick to the heated pressure member so that when the pressure members separate the momentarily sealed films are pulled apart or stick to the heated member and cannot be removed easily. Examples of such films are Polythene (polyethylene), Pliofilm (rubber hydrochloride), Koroseal (polyvinyl chloride), and Saran.

It is the object of the present invention to provide a method and apparatus for sealing films of the character described without destroying the seal or the films.

It is another object of the invention to provide a method and apparatus which can heat-seal films of the character described quickly, simply and efficiently.

It also is well known that films of the character described have a tendency to shrink in the vicinity of the heat-seal, causing the pellicles to become wrinkled around the seal.

It is a further object of the invention to provide a method and apparatus of the character described capable of heat-sealing plastics such as above mentioned without leaving the same wrinkled.

Other objects of the invention will in part be obvious and in part will be pointed out hereinafter.

The invention, accordingly, consists in the features of construction, combinations of elements and arrangements of parts, which will be exemplified in the devices hereinafter described, and of which the scope of application will be indicated in the appended claims.

2

In the accompanying drawings in which are shown various possible embodiments of the invention, Fig. 1 is a front, partially schematic view of a foot-operated sealing apparatus constructed in accordance with the invention, certain portions of the apparatus having parts broken away better to show their internal construction;

Fig. 2 is an enlarged sectional view taken substantially along the line 2—2 of Fig. 1, the apparatus being shown with the pressure jaws spaced apart to admit plastic sheets;

Fig. 3 is a perspective view of an open plastic bag such as is adapted to be sealed in apparatus embodying the present invention;

Fig. 4 is a view similar to Fig. 2, but with the pressure jaws closed;

Fig. 5 is a view similar to Fig. 3, but showing the envelope after it has been closed by heat-sealing;

Fig. 6 is a front view of an apparatus embodying a modified form of the invention;

Fig. 7 is a perspective view of a web constituting a flat plastic tube which is adapted to be heat-sealed in an apparatus embodying another modified form of the invention.

Fig. 8 is a front view of a machine incorporating a modified form of the invention and adapted to heat-seal a web such as shown in Fig. 7; and Fig. 9 is an enlarged sectional view taken substantially along the line 9—9 of Fig. 8.

Referring now in detail to the drawings, and more particularly to Figs. 1–5, the reference numeral 10 denotes an apparatus embodying the present invention. Said apparatus comprises a movable sealing shoe 12 of any suitable configuration. The shoe is attached to and carried by a metal frame 14 which, in order to permit interchanging of shoes has a slot 16 formed in its undersurface. The shoe includes an upstanding rib 18 designed to be fitted within said slot. Said shoe is detachably held in place by any suitable means, for example, by machine screws 20 which pass freely through openings in the sealing shoe and are threaded into tapped holes in the frame 14. The frame is secured, for instance with bolts 22, to a rod 24 reciprocally mounted in a bearing 26. As shown herein, the bearing is disposed to hold the rod vertically.

Means also is included to oscillate said rod when desired. Such means includes a foot treadle 28 which rocks on a pin 30. Said treadle is pivotally connected by another pin 32 to the lower end of a vertical link 34 whose upper end is pivotally connected by a pin 36 to the back of a rocking beam 38 pivoted at 40. The forward end of the rocking beam is pivotally connected to a short link 42 which is pivotally connected to the upper end of the rod 24. Thus the operator, by pressing the foot treadle, can lower the sealing shoe.

The apparatus includes means continuously to heat the sealing shoe to sealing temperature. Said means optionally may be in the form of a thermostatically controlled heating cartridge 46 snugly received within a horizontally extending well 48 near the top of the frame 14. Leads 50 run to a suitable source of electrical energy (not shown). A switch (also not shown) may be interposed in the leads.

The apparatus may be provided with a support or stationary jaw 52 that is unheated although, if desired, this jaw can be mildly heated to a temperature below sealing temperature. For a purpose which later will be pointed out, the surface of this jaw which is employed for sealing may be covered with a layer 54 of cushioning material. Any such material can be used which is not affected by the pressure or temperature to which this layer is subjected. Cloth, for instance, will give satisfactory results.

As thus far described, the apparatus is conventional and has been referred to in detail principally to facilitate understanding of the invention.

In accordance with the instant invention, the apparatus includes a sheet 56 of material beneath and normally spaced from the operative undersurface of the sealing shoe 12. This sheet and the sealing shoe are so mutually arranged that the sealing shoe can be moved into and out of engagement with one surface of said sheet, the other surface of the sheet being adapted to engage objects to be heat-sealed. The material of which said sheet is composed is characterized by its ability to withstand the heat and pressure imposed thereon as an incident to heat-sealing. The following are examples of satisfactory materials: sheets of metal, e. g. aluminum, copper, brass and steel sheets; mineral fiber, e. g. asbestos cloth and glass cloth; animal fiber, e. g. wool cloth; vegetable fiber, e. g. cotton cloth; and synthetic plastics which are stable at the temperature employed for sealing. One material which I have found particularly satisfactory is Teflon (polytetrafluoroethylene). This material is employed as a comparatively thin sheet, ranging from 0.001 to 0.010 of an inch in thickness.

The sheet 56 conveniently is elongated in the same direction as the sealing shoe and is supported by a hollow oblong plate 58. Said sheet covers the elongated opening of the plate and is located on the lower surface thereof. If desired, the plate may include upper and lower sections between which the sheet is clamped. Alternatively the illustrated construction can be employed wherein mounting strips 60 are employed to hold the sheet in position.

The plate 58 and the sheet 56 are carried by the sealing shoe. More specifically, said plate includes a set of erect pins 62 whose lower ends are affixed thereto.

The upper ends of the pins are slidable in pilot holes provided in the frame 14. Each pin is encircled by a compressed spring 64 disposed between the frame 14 and plate 58. To limit downward movement of the plate relative to the sealing shoe, the several pins are provided with collars 66 disposed above the frame 14.

In the operation of the device, a bag 68, such for example as shown in Fig. 3, which has been filled and whose mouth 70 still is open has its open side inserted in the apparatus 10 between the stationary jaw 52 and the sheet 56. The operator then steps on the treadle 28 causing the rod 24 to descend. As this occurs, the sheet 56 first will press against the upper surface of the bag mouth and force the lower surface of the mouth against the jaw 52. Thereafter, the sealing shoe will descend into contact with and press against the upper surface of the sheet 56. Heat will flow from the sealing shoe through the sheet 56 into the mouth of the bag to be sealed and the pressure of the operator's foot on the treadle 28 will cause pressure to be applied to the zone of the bag to be sealed.

After a sufficient period of time, determined by experience, pressure is released from the treadle and the parts thereupon will resume their idle position shown in Fig. 1. Resumption of this position may be caused by a spring or by gravity. In the latter case, the link 34 is made sufficiently heavy to overbalance the treadle and rod and parts carried thereby.

As the rod 24 moves upward, first the sealing shoe will rise and separate from the sheet 56. Further upward movement of the spindle, after the full separation of said sheet and sealing shoe, will lift the sheet away from the jaw 52. These two actions follow one another very quickly in actual practice, so that when the sheet 56 is lifted the seal which just has been formed still is hot. As a result, the sealed pellicles will adhere to the undersurface of the sheet 56 and be lifted thereby. Such adherence causes the seal substantially to maintain its original areal configuration, that is to say, it will greatly minimize or prevent the sheet from shrinking in the region of the seal and thus little or no shrinking of the sealed pellicles will occur.

The sheet 56 will cool rapidly because the sealing shoe has been disengaged therefrom and because said sheet has only a small heat storage capacity due to its thinness. The heat remaining in the sheet after disengagement from the sealing shoe quickly is lost by radiation and convection from the large flat surface of the sheet. As the sheet cools down so do the plastic pellicles which had been heat-sealed, until eventually, in a period of time well below a minute, the heat-sealed pellicles drop to a temperature at which they no longer are adhesive. At this point, said pellicles either will drop off the sheet 56 by virtue of their own weight or they can be pulled off the Teflon sheet with a very slight effort. In either event the heat-sealed pellicles will be stripped from the Teflon sheet without mutilation of the seal.

The apparatus 10 can be modified for automatic use in order to enable it to be employed, for example, as part of a machine in which a sequence of operations is performed in accordance with a predetermined timing cycle.

Such a modified apparatus is illustrated in Fig. 6 wherein, instead of employing a treadle-actuated linkage mechanism for reciprocation of the heated jaw, a cam is employed for such purpose. Said modified form of apparatus is denoted by the reference numeral 80 and all parts of the sealing apparatus which are similar to like components of the apparatus 10 are denoted by similar reference characters primed.

Said apparatus 80 has a frame 14' carried by a rod 24'. A journal 26' for the rod forms part of a standard 82 in which a shaft 84 rotates. Said shaft has mounted thereon a disc 86 in which a cam groove 88 is fashioned. A roller 90 which rides in said groove is secured to the rod 24'. The upper end of said rod is formed with an elongated vertical slot 92 which slides along the shaft 84 to guide said end of the rod.

It also will be appreciated that, if desired, the apparatus 10 can be employed without a jaw 52 directly beneath and in contact with one of the pellicles to be sealed.

The apparatus can be simplified where the pellicles to be sealed move along a path transverse to the direction of movement of the sealing shoe, i. e., parallel to the plane of the sheet 56. An example of such a simplified apparatus is shown in Figs. 8 and 9 wherein such apparatus is denoted by the reference numeral 100.

This apparatus is specially designed for use in conjunction with sealing a web 102 constituting a flattened plastic tube having a wall thickness of the same order as that of plastic films. Said tube is passed through the apparatus over suitable guide means, as for example between a pair of rollers 103, 104. The roller 104 in conjunction with an associated roller 106, function as feed rollers for the web. Said roller 106 is intermittently actuated by a Geneva train 108 from a drive shaft 110 so that during a cycle of operation of the machine, the web first is advanced and then stopped.

The drive shaft, in addition to a sheave 112 which powers the Geneva drive, carries a cam 114 having a track 116 in which a roller 118 rides. The roller is supported at one end of a lever 120 whose opposite end is connected by a link 122 to a rod 124 which is mounted for reciprocation in a vertical journal 126. The lower end of the rod carries a frame 128 in which a sealing shoe 130 is detachably secured in the same fashion as that in which the shoe 12 is mounted. The frame 128 has a heating cartridge 132 accommodated in a suitable chamber 134. Said frame is guided for movement by pilot pins 136 slidable in apertures 138 in the frame.

At a point intermediate the rolls 103, 104 a platform 140 is provided having a slotted bed 142 across which the web 102 rides. This bed is directly beneath the sealing shoe. The pilot pins 136 are secured to and project from said platform. Also secured to the platform is a sheet 144 made of the same material as the sheet 56, for example Teflon. This sheet spans the bed 142 and is held adjacent opposite sides thereon in any suitable fashion, for instance by mounting strips 146 and screws 148. The upper surface of the Teflon sheet is perpendicular to the direction of reciprocation of the sealing shoe and the undersurface of said sheet is parallel to the web 102 and its path of movement as it crosses the platform 140. Since the web moves in a fixed path, the Teflon sheet can be located very close to it. As a matter of practice it can be placed one-sixteenth of an inch from the path of the web.

In the operation of the device the cam 114 is timed to move the sealing shoe against the Teflon sheet when the web 102 is stationary. The sealing shoe will depress the Teflon sheet into contact with the web with sufficient pressure and for a sufficient period of time to heat-seal the web as indicated by the dotted lines 150 (see Fig. 7). Subsequently, the shoe will back off and the web, after cooling, will separate from the sheet before the web again is advanced.

It thus will be seen that I have provided machines and methods for heat-sealing thermoplastic materials which achieve the several objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described the invention, there is claimed as new and desired to be secured by Letters Patent:

1. Apparatus for heat-sealing thermoplastic pellicles, said apparatus comprising a sheet capable of maintaining its own form under the heat and pressure imposed thereon as an incident to heat-sealing, a frame engaging the edges of said sheet to support said sheet in flat condition, a sealing shoe, means continuously to heat said sealing shoe, means to mount said sealing shoe for movement into and out of engagement with one side of said flat sheet, means ot connect said shoe and frame and a spring biasing said shoe and frame apart.

2. An apparatus for heat-sealing thermoplastic pellicles, said appartaus comprising a sheet capable of maintaining its own form under the heat and pressure imposed thereon as an incident to heat-sealing, said sheet being adapted to contact a thermoplastic pellicle in the region to be heat-sealed, a frame engaging the edges of said sheet to support said sheet, a sealing shoe, means to heat said sealing shoe, means to mount said sealing shoe for movement into and out of engagement with the side of said sheet opposite to the side which is adapted to engage a thermoplastic pellicle, and a spring biasing the shoe and frame apart.

3. An apparatus for heat-sealing thermoplastic pellicles, said apparatus comprising an anvil, a sealing shoe, means to heat said sealing shoe, means to mount said sealing shoe for movement between a position in proximity to the anvil and a position remote from the anvil, a sheet capable of maintaining its own form under the heat and pressure imposed thereon as an incident to heat-sealing, and means to support the edge of said sheet from said shoe with the sheet in position between the anvil and the side of the shoe facing the anvil, said last named means including means to mount said sheet for movement toward and away from said side and a spring biasing the sheet away from said side, whereby the sheet is normally spaced from said side, and when the shoe is moved from its second named position to its first named position, a pellicle on the anvil first will be contacted by the sheet and subsequently the shoe will press the pellicle against the anvil through the sheet.

4. An apparatus for heat-sealing thermoplastic pellicles, said apparatus comprising an anvil, a sheet capable of maintaining its own form under the heat and pressure imposed thereon as an incident to heat-sealing, a frame engaging the edges of said sheet to support said sheet in flat condition, means mounting said frame for movement between an operative position in which the sheet contacts a pellicle on the anvil and an idle position in which the sheet is spaced from a pellicle on the anvil, a sealing shoe located on the side of the sheet opposite from a pellicle on the anvil, means to heat said sealing shoe, and means mounting said shoe for movement between an operative position in which the shoe engages the sheet and presses the sheet against a pellicle on the anvil and an idle position in which the shoe is spaced from the sheet and from a pellicle on the anvil.

ERNEST J. ANDINA.

References Cited in the file of this patent

UNITED STATES PATENTS

| Number | Name | Date |
|---|---|---|
| 768,297 | Peck | Aug. 23, 1904 |
| 1,587,462 | Adams et al. | June 1, 1926 |
| 1,816,115 | Helle | July 28, 1931 |
| 1,970,941 | Paugh | Aug. 21, 1934 |
| 2,311,013 | Whitehead | Feb. 16, 1943 |
| 2,379,793 | Eenigenburg | July 3, 1945 |
| 2,394,822 | Teplitz | Feb. 12, 1946 |
| 2,441,940 | Rohdin | May 18, 1948 |
| 2,460,460 | Langer | Feb. 1, 1949 |
| 2,473,552 | Staw | June 21, 1949 |
| 2,509,439 | Langer | May 30, 1950 |
| 2,512,275 | Hawk | June 20, 1950 |